United States Patent
Casey

(10) Patent No.: US 7,515,391 B2
(45) Date of Patent: Apr. 7, 2009

(54) LINEAR LOW CAPACITANCE OVERVOLTAGE PROTECTION CIRCUIT

(75) Inventor: Kelly C. Casey, Flower Mound, TX (US)

(73) Assignee: Littelfuse, Inc., Des Plaines, IL (US)

( * ) Notice: Subject to any disclaimer, the term of this patent is extended or adjusted under 35 U.S.C. 154(b) by 0 days.

(21) Appl. No.: 11/254,162

(22) Filed: Oct. 19, 2005

(65) Prior Publication Data

US 2007/0086137 A1 Apr. 19, 2007

(51) Int. Cl.
*H02H 9/04* (2006.01)
*H02H 1/04* (2006.01)
*H02H 3/22* (2006.01)
*H04M 1/00* (2006.01)

(52) U.S. Cl. .................... 361/56; 361/119; 361/111; 379/412

(58) Field of Classification Search ................. 379/412; 361/56, 119, 111
See application file for complete search history.

(56) References Cited

U.S. PATENT DOCUMENTS

| | | | |
|---|---|---|---|
| 3,609,512 A * | 9/1971 | Lewis ..................... 361/89 |
| 4,282,555 A | 8/1981 | Svedberg |
| 4,577,255 A | 3/1986 | Martin |
| 5,008,602 A | 4/1991 | Stevens et al. |
| 5,195,130 A | 3/1993 | Weiss et al. |
| 5,196,980 A | 3/1993 | Carson |
| 5,326,994 A | 7/1994 | Giebel et al. |
| 5,401,985 A | 3/1995 | Anceau |
| 5,539,820 A * | 7/1996 | Pistilli ..................... 361/119 |
| 5,625,519 A | 4/1997 | Atkins |
| 6,252,754 B1 | 6/2001 | Chaudhry |
| 6,259,123 B1 | 7/2001 | Kelberlau et al. |
| 6,268,990 B1 | 7/2001 | Ogura et al. |
| 6,421,220 B2 * | 7/2002 | Kobsa ..................... 361/120 |
| 6,580,789 B1 | 6/2003 | Simpson et al. |
| 6,628,497 B1 * | 9/2003 | Napiorkowski et al. ..... 361/119 |
| 6,680,839 B2 | 1/2004 | Napiorkowski |
| 6,777,726 B2 * | 8/2004 | Tihanyi ..................... 257/244 |
| 6,870,202 B2 | 3/2005 | Oka |
| 6,876,742 B1 * | 4/2005 | Sacca ..................... 379/412 |
| 6,952,335 B2 | 10/2005 | Huang et al. |
| 6,954,347 B1 | 10/2005 | Chaudhry |
| 7,224,052 B2 | 5/2007 | Nishizawa et al. |
| 7,266,195 B1 | 9/2007 | Dupuis et al. |
| 2004/0070050 A1 | 4/2004 | Chi |
| 2004/0188818 A1 | 9/2004 | Wang |
| 2004/0222925 A1 | 11/2004 | Fabrege-Sanchez et al. |
| 2004/0246641 A1 | 12/2004 | Sugimoto et al. |

OTHER PUBLICATIONS

35 USC 102(f) prior art by Mr. Ben Itri (See attached drawing and description).
Semtech Product Brochure, Low Cap. 3.3 Volt TVS, Oct. 14, 2004.
Office Action in U.S. Appl. No. 11/254,164, dated Jan. 28, 2008.
Office Action in U.S. Appl. No. 11/254,163, dated Jan. 22, 2008.
Littelfuse, Applicaiton Notes Set Top Box Over-Voltage and Over-Current Protection, product brochure, 2001, 4 pages.

* cited by examiner

*Primary Examiner*—Michael J Sherry
*Assistant Examiner*—Lucy Thomas
(74) *Attorney, Agent, or Firm*—Roger N. Chauza, PC

(57) ABSTRACT

A bipolar semiconductor overvoltage protection circuit presents less capacitance to a communication line. The overvoltage protection circuit includes an overvoltage protection device that is biased with a voltage to not only reduce the capacitance thereof, but also to reduce the change in capacitance as a function of frequency. Changes in communication line voltages thus change the capacitance of the overvoltage protection device less, resulting in the ability to allow the transmission of high capacity data protocols with reduced error rates.

11 Claims, 4 Drawing Sheets

US 7,515,391 B2

LINEAR LOW CAPACITANCE OVERVOLTAGE PROTECTION CIRCUIT

TECHNICAL FIELD OF THE INVENTION

The present invention relates in general to overvoltage protection devices and circuits, and more particularly to overvoltage protection circuits providing reduced capacitance changes in circuits that experience changing voltages.

RELATED APPLICATIONS

This non-provisional patent application is related to U.S. patent application entitled "Stacked Integrated Circuit Chip Assembly" by Chad A. Vos, Ser. No. 11/254,163, filed on even date herewith. This non-provisional patent application is also related to U.S. patent application entitled "Integrated Circuit Providing Overvoltage Protection For Low Voltage Lines" by Chad A. Vos and Kelly C. Casey, Ser. No. 11/254, 163, filed on even date herewith.

BACKGROUND OF THE INVENTION

Many circuits in electronic equipment provide protection from the harmful effects of overvoltages, overcurrents, etc. These protection circuits are often designed as an integral part of the general electronic circuit, but may be added thereto as ancillary devices or circuits.

Protection circuits may often be constructed on silicon substrates, such as bipolar transistors, diodes or thyristors. Silicon bipolar devices can carry large magnitudes of current and thus are well adapted for use in protecting electronic circuits from damage by overvoltages and overcurrents. Solid state bipolar devices constructed with junctions have an inherent capacitance that is a function of the width of the depletion region. The depletion region in a semiconductor junction functions as the "dielectric" layer of a capacitor. Since the width of the depletion region varies with the voltage impressed across the junction, the capacitance of a bipolar semiconductor junction varies as a function of the voltage applied across the junction. Capacitors whose values vary with voltage are inherently nonlinear devices. In other words, a bipolar overvoltage protection device placed across a circuit to be protected can affect the operation of the circuit even if the overvoltage protection device remains in its off state. The non-linearity can lead to suboptimal channel performance and intermodulation distortion.

The adverse affects of the foregoing are experienced in many applications, including communication lines where overvoltage protection circuits are routinely employed to protect transmitting and receiving circuits from high voltages that may be inadvertently coupled to the communication lines. Many devices in the thyristor family can be employed to respond to the overvoltage condition and provide a low impedance path between the communication line and ground, or other path where the energy is safely dissipated.

The adverse affects of the use of silicon bipolar overvoltage protection devices may not arise from the fact that such devices have an inherent capacitance, but rather from the characteristic that such capacitance changes as a function of the voltage applied across the device. As an example, many communication lines are adapted for carrying high speed digital signals of various protocols, including ADSL, T1, E1, ADSL2+, ADSL2++, 10BaseT, VDSL, VDSL2, T3, 100BaseT and others. Many of these protocols are carried between remote destinations by way of modems or other transmission and receiving circuits. In order to optimize the transmission of high speed data, many modems utilize an initial process of selecting the proper equalization components so that the digital signals can be transmitted at the highest speed permitted by the frequency response of the line and the circuits associated with the line. The equalization parameters selected by the modem are those that exist at the time equalization testing is carried out—usually once when the modem is placed in service, and on each reboot thereof after initial operation. It can be seen that if the electrical state of the line changes after the equalization session, the transmission data rate may not be optimized, and thus transmission errors can occur.

An example of transmission inefficiencies can arise in connection with the following example. A modem placed on line or booted into operation will be programmed to automatically carry out an equalization process for determining the best electrical parameters to be switched into operation to optimize high speed data transmission. The modem will be connected to the communication line, such as a telephone DSL line adapted for carrying VDSL or other data signals. An on-hook state (of the telephone set) of the DSL line for carrying digital signals is typically 48 volts. After the modem has completed the equalization process, it is situated to provide optimum transmission of the VDSL signals, based on the electrical characteristics of the DSL communication line that existed during the equalization process.

During an actual communication session by a user in which the VDSL signals are being transmitted at a high rate, assume that the user's telephone set connected to the same DSL communication line is placed in an off-hook condition. In other words, the user is simultaneously using the DSL communication line for both verbal communications with the telephone set, and for data communications using the modem. This off-hook condition places a different set of voltages on the communication line. The communication line goes from a 48-volt on-hook state to about a 10-volt off-hook state. As such, the capacitance of the overvoltage protection devices, and possibly other devices, will change, thus changing the electrical characteristics of the lines to which the modem was equalized. With the communication line now having different electrical characteristics, the effective transmission rate may be lowered, but the modem keeps transmitting at the rate optimized during the equalization session. As a result, the data receiver or modem at the receiving end of the communication line may detect errors arising from the transmission of data at a rate higher than the line can reliably carry in the off-hook condition. The excessive error rate may cause the modem to retrain, which results in a temporary loss of service during retraining, which is unacceptable.

From the foregoing, it can be seen that a need exists for a technique for making overvoltage protection devices and circuits less prone to changes in capacitance as a function of voltage, and thereby reduce the change in electrical characteristics of the devices or circuits connected to the lines. Another need exists for an efficient method of packaging overvoltage protection devices so that simple voltages can be applied to the pins or terminals thereof to make more linear the capacitance/voltage characteristics.

SUMMARY OF THE INVENTION

In accordance with an important feature of the invention, disclosed is the use of an overvoltage protection device for providing overvoltage protection to a communication line, and a bias circuit for biasing the overvoltage protection device through a pair of isolation resistors. The bias voltage places the overvoltage protection device into an operational area where the change in capacitance of the device is less dependent on the voltage applied across the device.

In accordance with another feature of the invention, disclosed is an overvoltage protection circuit having at least two terminals. The overvoltage protection device is responsive to an overvoltage for providing a low impedance path between the two terminals. The overvoltage protection device is characterized by a surge current. Provided is a diode bridge with at least four diodes and having a first node and a second node. The overvoltage protection device is connected between the first and second nodes of the diode bridge. Some of the diodes have junction areas for carrying the surge currents of the overvoltage protection device and not substantially larger, thereby minimizing a capacitance of the diodes.

In accordance with yet another feature of the invention, disclosed is an overvoltage protection circuit which includes a diode bridge adapted for connection to a communication line. An overvoltage protection device is connected to nodes of the diode bridge so that current resulting from overvoltages of different polarities on said communication line passes through the overvoltage protection device in one direction. A first resistance and a second resistance are connected to different terminals of the overvoltage protection device. The resistances are adapted for connection to a bias voltage supply.

Another important feature of the invention is a method of protecting a communication line using an overvoltage protection circuit. The method includes biasing an overvoltage protection device with a bias voltage to reduce the capacitance of the overvoltage protection device. The overvoltage protection device is coupled to a diode bridge so that when the diode bridge is connected to a communication line, currents of different polarities resulting from respective overvoltages pass through the overvoltage protection device in one direction.

According to yet another feature of the invention, disclosed is a method of constructing an overvoltage protection circuit. The method includes the steps of selecting an overvoltage protection device having a desired peak current and a desired breakover voltage. Further included is the step of selecting diodes for a bridge so that at least some of the diodes of the bridge have a peak current not substantially higher than that of the overvoltage protection device. The overvoltage protection device and the diodes of the bridge are placed in series, thereby providing a low capacitance overvoltage protection circuit.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which.

DETAILED DESCRIPTION OF THE INVENTION

Figure 1A:
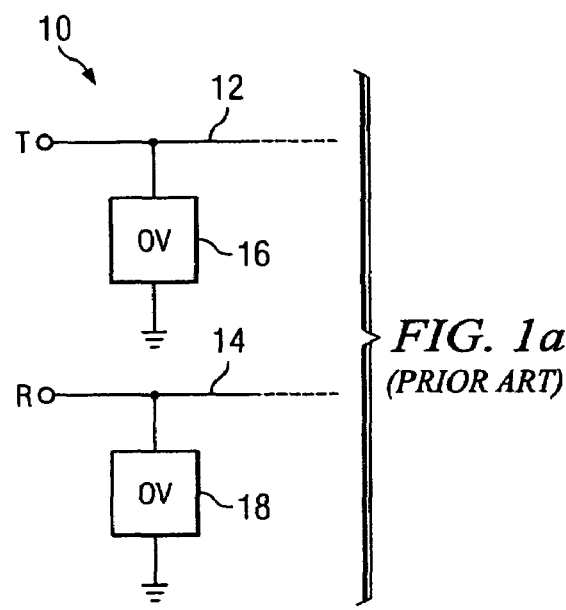
FIG. 1a illustrates a first method for providing overvoltage protection to a communication line.

Referring to FIG. 1a of the drawings, there is shown an environment 10 in which the invention can be advantageously practiced. Here, the communication line includes a tip conductor 12 and a ring conductor 14. An overvoltage protection device 16 is connected between ground, or some other voltage source, and the tip conductor 12 to provide overvoltage protection to such conductor 12. The ring conductor 14 is similarly connected to overvoltage protection device 18 to provide overvoltage protection thereto. In this circuit 10, both overvoltage protection devices 16 and 18 are preferably bidirectional devices constructed on the same silicon chip so as to present balanced electrical characteristics to both communication line conductors 12 and 14. The bidirectional characteristics of the overvoltage protection devices 16 and 18 provide overvoltage protection for both polarities of overvoltages. In addition, it is preferable that both overvoltage protection devices 16 and 18 have breakover voltages ($V_{BO}$) that are substantially the same. If either the tip conductor 12 or the ring conductor 14, or both, experience an overvoltage thereon, the respective overvoltage protection device 16 or 18, or both, will be driven into conduction and provide a low resistance path to ground. The electronic circuits (not shown) connected to the communication line are thus protected.

The overvoltage protection devices 16 and 18 present a high impedance to the communication line conductors 12 and 14 when in the off state, but nevertheless have intrinsic capacitances associated therewith. The overvoltage protection devices 16 and 18 are typically four-layer thyristor devices constructed with bipolar junctions. The capacitance of such bipolar devices may be under 100 picofarads. Sidactor® overvoltage protection devices, obtainable under the Teccor brand from Littelfuse, Des Plaines, Ill., have been widely used in the industry as high speed, high surge current, low overshoot devices in overvoltage protection circuits.

Figure 1B:
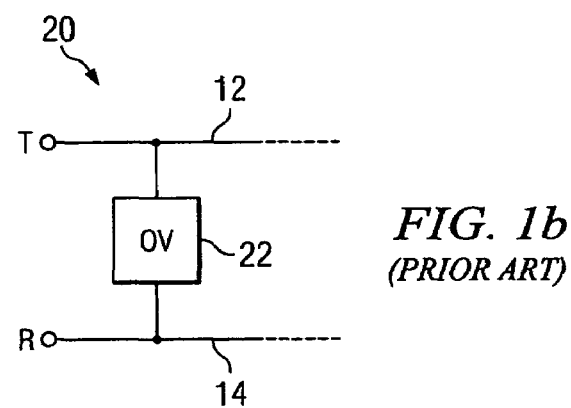
FIG. 1b illustrates a second method for providing overvoltage protection to a communication line.

FIG. 1b illustrates another example 20 in which a single bidirectional overvoltage protection device 22 is connected between the tip conductor 12 and the ring conductor 14 of a communication line to provide overvoltage protection thereto. In this protection configuration, any overvoltage applied to one communication line causes the overvoltage protection device 22 to conduct and couple the energy to the other communication line. The down stream circuits connected to the communication line are thus protected. While not shown, a unidirectional overvoltage protection device and diode bridge can be substituted for the bidirectional overvoltage protection device 22.

Figure 1C:
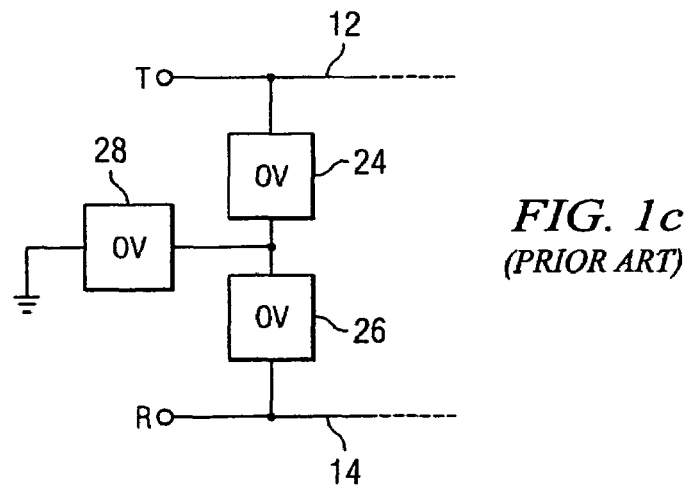
FIG. 1c illustrates a third method for providing overvoltage protection to a communication line.

FIG. 1c illustrates an overvoltage protection configuration in which three overvoltage protection devices 24, 26 and 28 are employed to protect the tip conductor 12 and ring conductor 14 of the communication line. This configuration presents a balanced protection circuit for the communication line. The cumulative breakover voltage of series-connected devices 24 and 28 is preferably the same as the cumulative breakover voltage of series-connected devices 26 and 28. The devices can be selected in the manner set forth in U.S. Pat. No. 4,905,119, by Webb. The series-connected arrangement of two devices of FIG. 1c reduces the change in voltage in each semiconductor junction, which reduces the magnitude of the change in capacitance.

Figure 2:
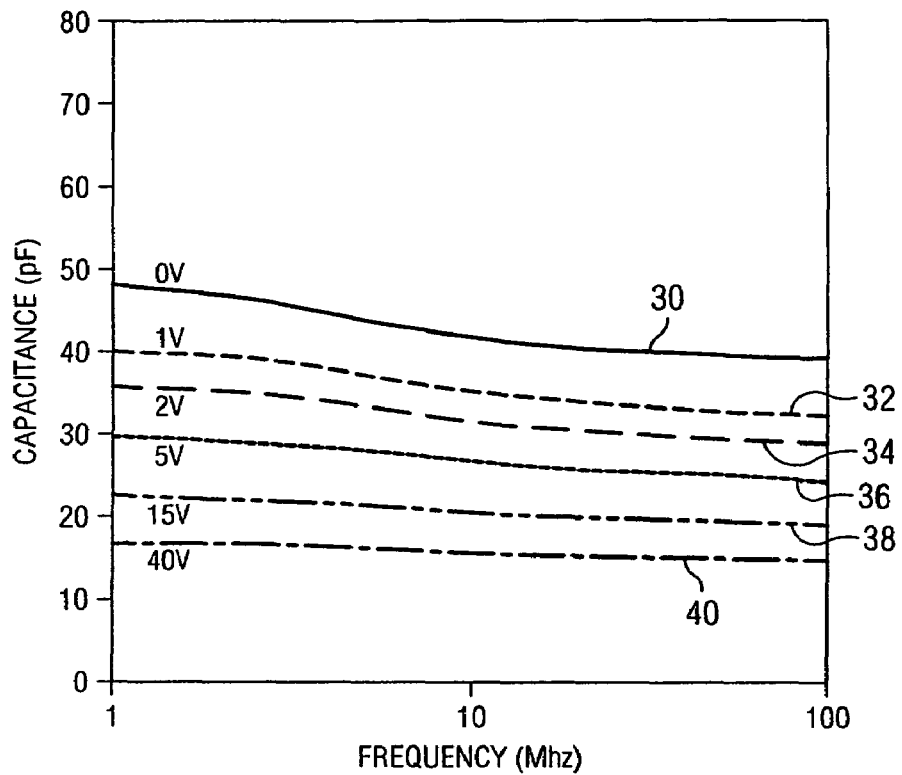
FIG. 2 graphically depicts a conventional capacitance versus frequency characteristic of a bipolar semiconductor overvoltage protection device, where the voltage across the device is a variable parameter.

FIG. 2 graphically illustrates the capacitance/frequency characteristics a conventional bipolar overvoltage protection device, as a function of different voltages applied across the device. It is noted that the horizontal frequency axis is a logarithmic scale. In particular, the graph depicts the electrical characteristics of a Sidactor® overvoltage protection device, part number P3100SCMC, available from Teccor Electronics. Line 30 depicts the capacitive/frequency characteristics of the device with 0 volts applied thereacross. Line 32 depicts the capacitive/frequency characteristics of the device with 1 volt applied thereacross. Line 34 depicts the capacitive/frequency characteristics of the device with 2 volts applied thereacross. Line 36 depicts the capacitive/frequency characteristics of the device with 5 volts applied thereacross. Line 38 depicts the capacitive/frequency characteristics of the device with 15 volts applied thereacross. Line 40 depicts the capacitive/frequency characteristics of the device with 40 volts applied thereacross. These electrical characteristics are those of the device while in a test circuit, without any other communication circuits connected thereto.

It is noted that with higher voltages applied across the bipolar overvoltage protection device, there is less change in capacitance as a function of frequency. This is generally true of most bipolar overvoltage protection devices. However, the problem encountered is that the voltage across an overvoltage protection device cannot generally be known or predicted at all times when connected to communication circuits or communication lines. Thus, when the voltage across such device is low, the other communication circuits will have to operate with the variations of capacitance of the overvoltage protection device. When transmitting VDSL and other high speed digital signals on a DSL line, this means either reducing the transmission speed to a rate less than otherwise would be necessary to accommodate the increased capacitance of the overvoltage protection device, or accept a higher error rate. Neither of these solutions is acceptable to either communication providers or users.

With reference back to FIG. 2, it is noted that for low voltages across the overvoltage protection device, namely between about one and five volts, the capacitance of the device changes substantially more than for higher voltages across the device. For the particular device of the example, and for a voltage of one volt applied across the device, the capacitance of the device changes about 5 pf, from about 40 pf to about 35 pf, between the frequency range of 1 MHz and 10 MHz. This represents about a 12.5% change in capacitance of the device. With the 1-volt potential applied across the device, the capacitance at 100 MHz is about 33 pf. Considering the same overvoltage protection device with a voltage of 40 volts across it, it is noted that the change in capacitance between 1 MHz and 10 MHz is about 1 pf (28 pf-27 pf), or about a 3.6% change in capacitance. At 100 MHz, the capacitance presented by the device with a 40 volt bias across it, is about 24 pf. The small degree of change in capacitance is seen from FIG. 2 by the linear 40-volt line. The other the lines in the graph representing lower voltages across the device are much more non-linear. It can also be seen that by assuring there is a voltage greater in magnitude than normally applied across the device, there is a corresponding reduction in capacitive change within the device. As noted above, with larger voltages applied across a bipolar semiconductor junction, there is a wider depletion region between the conductive regions (the capacitor plates) of the device, and thus less capacitance.

In accordance with an important feature of the invention, a bias voltage is applied to the overvoltage protection device so that it operates in a continuous manner with a lower capacitance, thereby allowing communication lines to operate with optimal speed and bandwidth. By assuring that there is always at least a predetermined voltage across the overvoltage protection device, it is assured that the communication line connected thereto undergoes a minimal degree of change in capacitance—at least the capacitance contributed by the overvoltage protection device.

Figure 3:
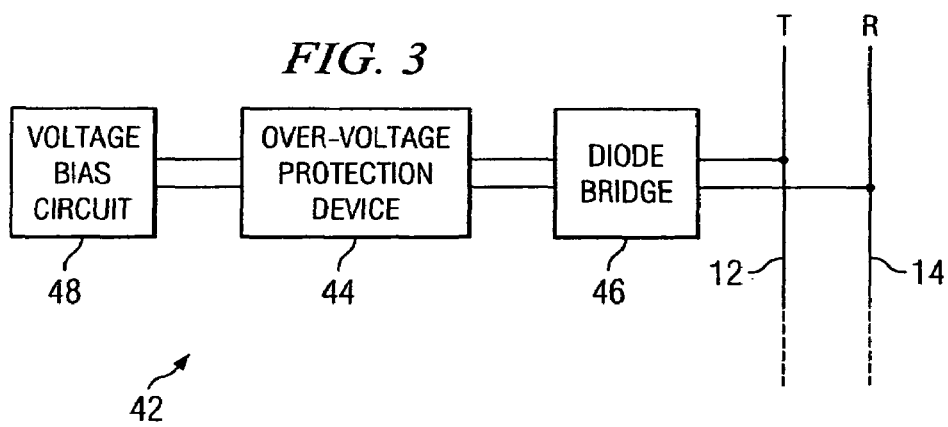
FIG. 3 illustrates in electrical diagram form a drawing of a biased overvoltage protection device according to one embodiment of the invention.

With reference now to FIG. 3, there is illustrated an embodiment of the invention in which an overvoltage protection device 44 is connected to a communication line 12 and 14 via a diode bridge 46. In addition, a bias voltage 48 is applied to the overvoltage protection device 44 so as to reduce the change in device capacitance in the manner described above. An important advantage of the overvoltage protection circuit 42 of FIG. 3 is that only a single overvoltage protection device 44 is required, and because of the diode bridge 46, such device 44 need only be a unidirectional device. The diode bridge 46 couples either polarity of overvoltage from the communication line 12 and 14 so that corresponding current flows through the overvoltage protection device 44 in the same direction.

Another important advantage in using a diode bridge is that the overall capacitance of the overvoltage protection circuit 42 is reduced. The capacitance the diodes of the bridge 46 in series with the capacitance of the overvoltage protection device reduces the overall capacitance of the circuit 42. As will be described more thoroughly below, the selection of the bridge diodes is important in achieving a low capacitance overvoltage protection circuit.

Figure 4:
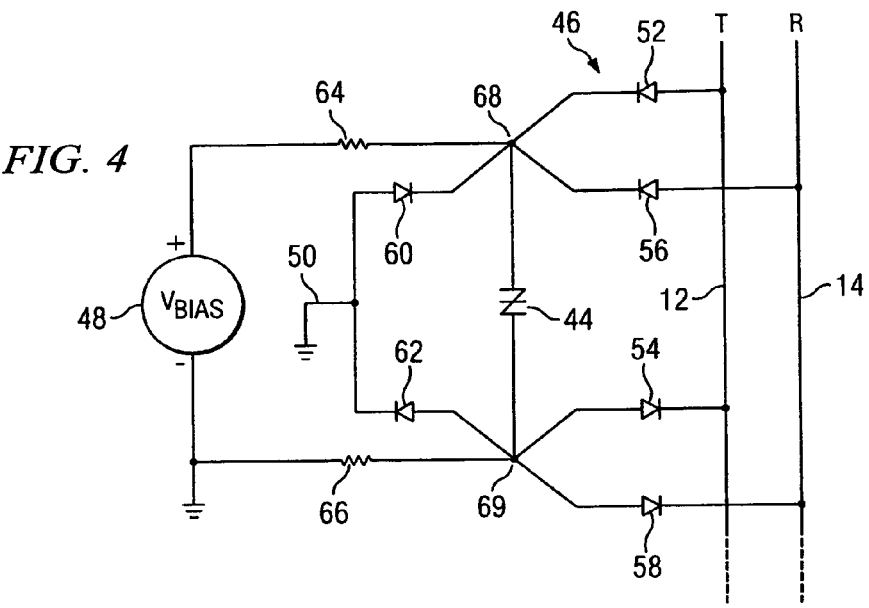
FIG. 4 is an electrical schematic drawing illustrating an overvoltage protection circuit according to one embodiment of the invention.

FIG. 4 illustrates a biased overvoltage protection circuit according to one embodiment of the invention. Here, a Sidactor overvoltage protection device 44 is a unidirectional bipolar device that is connected to a communication line which includes a tip conductor 12 and a ring conductor 14. A ground 50 is also included. The tip conductor 12, the ring conductor 14, and the circuit ground 50 are connected to nodes 68 and 69 of the overvoltage protection device 44 by respective diode pairs of the bridge 46. The tip conductor 12 is connected to the overvoltage protection device 44 by way of diode pairs 52 and 54, while the ring conductor 14 is connected to the overvoltage protection device 44 by diode pairs 56 and 58. The overvoltage protection device 44 is connected to ground 50 via nodes 68 and 69 by way of diode pairs 60 and 62. In particular, the cathode of diode 62 is connected to ground 50, and the anode of diode 60 is connected to ground 50. As noted above, overvoltages of either polarity can be conducted in a conventional manner from either the tip conductor 12 or the ring conductor 14, or both, to ground 50 through the various diodes of the bridge 46. As can be seen, the various current paths through the overvoltage protection device 44 include a first diode, the overvoltage protection device 44, and then a second diode. The three components are all in series, thus reducing the effective capacitance presented by the overvoltage protection circuit to the communication line 12 and 14.

In accordance with an important feature of the invention, a bias voltage is applied across the terminals of the overvoltage protection device 44. The voltage is preferably applied to the overvoltage protection device 44 on a continuous basis. Alternatively, the bias voltage can be applied only during the time when the communication line 12 and 14 is active in transmitting communication signals.

The voltage is applied to the overvoltage protection device 44 by a bias voltage source 48, through a pair of resistors 64 and 66. Preferably, the resistors 64 and 66 are of sufficiently high resistance so as to provide isolation between the voltage source 48 and the overvoltage protection device 44 when the latter is in a conductive state. In practice, the resistors can be on the order of one megohm each, or larger. However, in certain applications, the value of each resistor 64 and 66 could be as low as several hundred ohms. During periods of time when an overvoltage on the communication line 12 and 14 triggers the overvoltage protection device 44 into conduction, the presence of the bias voltage does not otherwise affect the breakover voltage or other electrical characteristics of the overvoltage protection device 44.

Figure 5:
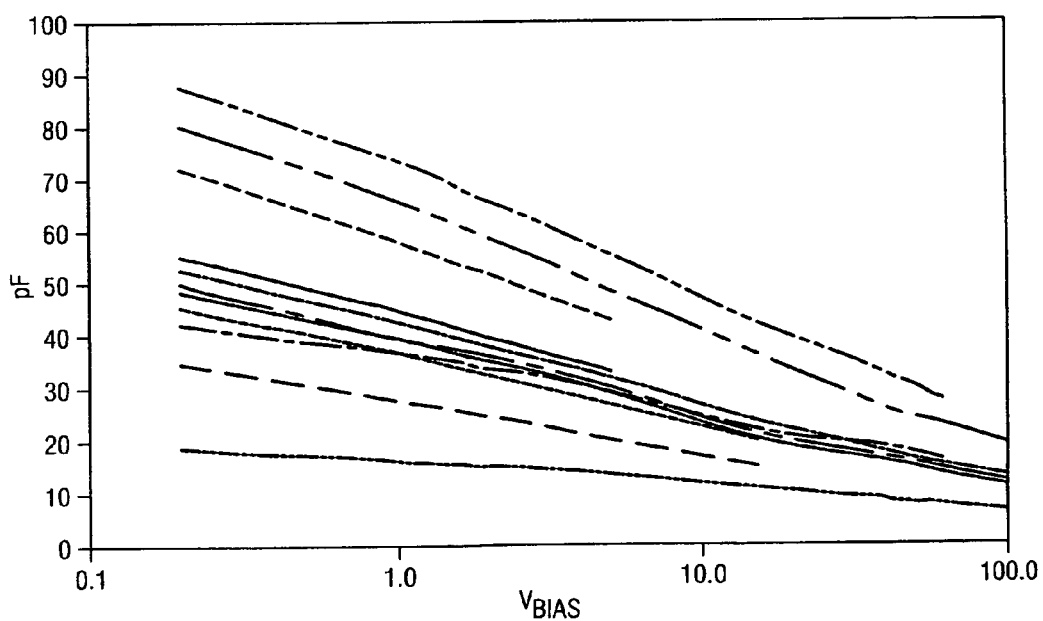
FIG. 5 graphically illustrates the capacitance/voltage characteristics of a number of solid state overvoltage protection devices.

It is noted that in the embodiment of FIG. 4, the bias voltage supply 48 is referenced to ground, as the negative terminal is connected to ground. The node 69 of the diode bridge 46 is referenced to ground through the isolation resistor 66. This biases the overvoltage protection device 44 at an operating point in which the device 44 exhibits less overall capacitance, and less change in capacitance as a function of frequency. FIG. 5 graphically illustrates the electrical characteristics of a number of different Sidactor overvoltage protection devices obtainable under the Teccor brand from Littelfuse, Des Plaines, Ill. These electrical characteristics are typical of bipolar devices, in that larger reverse bias junction voltages result in wider depletion regions. It can be seen that the capacitance of the overvoltage protection devices becomes significantly low at bias voltages of about 10 volts or greater. It should be noted that when thyristors are used as overvoltage protection devices for low voltage applications, such as for data communication lines, the junction doping level must be higher to reduce the breakover voltage of the device. However, devices with higher doping levels have increased junction capacitance due to the resulting narrower depletion regions. A thyristor having a low breakover voltage and also a low capacitance is thus difficult to achieve, but such a device is what is required for protection of high speed data communication lines.

With reference back to FIG. 4, the polarity of the bias voltage supply 48 is preferably such that the diodes of the bridge 46 are reverse biased during normal operation of the communication line 12 and 14. While the bias voltage supply 48 is shown with a grounded negative terminal, in other communication line situations, the overvoltage protection circuit can be configured to function with the positive terminal of the bias voltage supply 48 connected to ground.

In operation of the overvoltage protection circuit of FIG. 4, it is assumed that the bias voltage of the supply 48 is higher than the highest operating voltage of the communication line, but lower than the breakover voltage of the overvoltage protection device. The capacitance of the overvoltage protection device remains the same due to the constant bias voltage applied across the device. Changes in line voltage change the capacitance of the bridge diodes because the voltage across the diodes changes with the line voltage. As noted above, when operating with high data rates or in other environments where circuit capacitance changes are critical and undesirable, the biasing of overvoltage protection devices can improve communication line performance and reduce data transmission errors.

Figure 6:
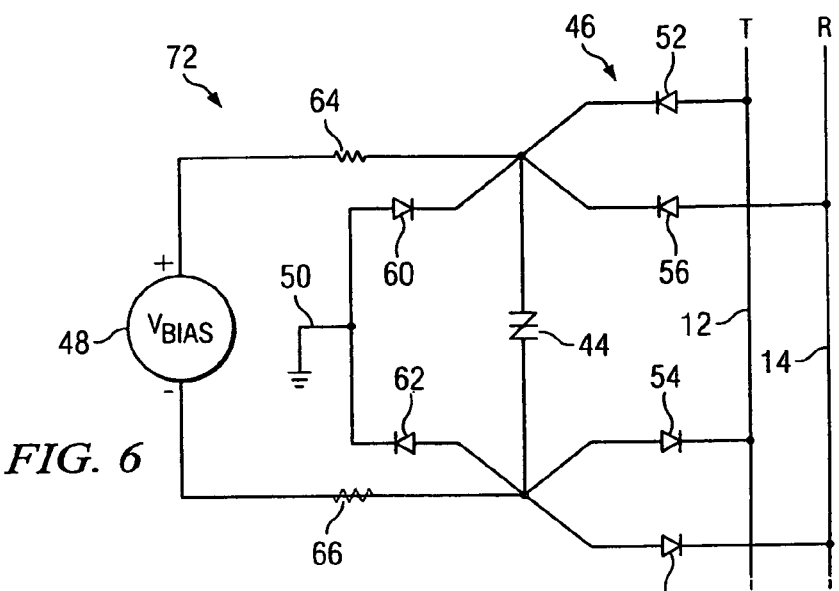
FIG. 6 illustrates another embodiment of an overvoltage protection circuit according to the invention.

As yet another alternative, if the use of a floating bias voltage supply was desired, then the overvoltage protection circuit 72 of FIG. 6 could be implemented. In this embodiment 72, the negative terminal of the voltage supply 48 is connected to node 69 of the diode bridge 46. Only a single isolation resistor 64 is illustrated, but an optional second isolation resistor 66 could be employed between the negative terminal of the bias voltage supply 48 and node 69 of the diode bridge 46. Again, only a single unidirectional overvoltage protection device 44 is employed, together with the diode bridge 46. Other configurations of the circuit 72 are possible, including the omission of resistor 64 and the utilization of resistor 66.

As noted above, the diodes of the bridge 46 in series with the overvoltage protection device 44 affords a low capacitance protection circuit. Such an arrangement is especially well suited for use in protecting high speed digital and other types of communication lines. The protection circuit has a characteristic low capacitance because the overall capacitance of such circuit is lower than the lowest capacitance device in the series arrangement. Accordingly, by using a low capacitance device in the protection circuit, it is assured that the overall capacitance is at least as low as the low capacitance device. In the overvoltage protection circuits described above, the protection devices 44 can have capacitances as low as about 20-30 pf. However, the bridge diodes are much simpler in design, and can have capacitances lower than that of the overvoltage protection device 44, namely as low as about 16 pf.

The capacitance of a semiconductor diode is a function of the junction area and the doping levels of the semiconductor regions. Diodes constructed with small junction areas have low capacitances, but are then limited in current carrying capabilities. Diodes with lightly doped semiconductor regions have low capacitances, and have corresponding high reverse breakdown voltages. Accordingly, in order to achieve a low capacitance diode, it is preferable to select the fabrication parameters so that small junction areas and lightly doped semiconductor regions are employed.

In accordance with an important feature of the invention, the current carrying capability of the bridge diodes 52, 54, 56 and 58 is determined by the maximum current carrying capability of the overvoltage protection device 44. In other words, there is no need to construct the bridge diodes with large junction areas for carrying currents well in excess of that of the overvoltage protection device 44. Thus, if the surge current of the overvoltage protection device 44 is 200 amp, then the bridge diodes 52, 54, 56 and 58 should be constructed or selected with junction areas only sufficiently large to safely carry similar surge currents. By making the junction area of the bridge diodes larger than necessary, the overall capacitance of the protection circuit is unnecessarily increased.

The bridge diodes 60 and 62 are preferably structured or selected to carry about twice the current as that of diodes 52, 54, 56 and 58. This is recommended in the event that both communication lines 12 and 14 undergo simultaneous overvoltages. For the sake of compact semiconductor devices, it is preferable to make the junction areas of diodes 60 and 62 no larger than necessary.

A high reverse breakdown voltage is desirable in all of the bridge diodes, and thus a light doping level in the semiconductor regions is preferable. This also reduces the junction capacitance accordingly.

Figure 7:
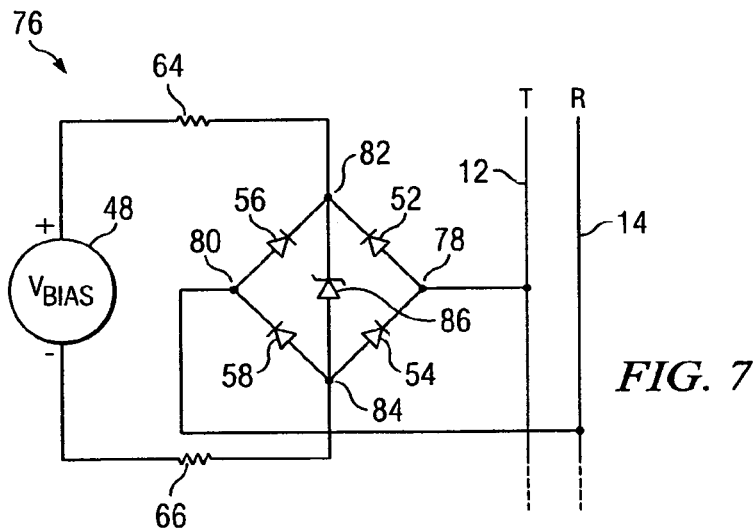
FIG. 7 illustrates yet another embodiment of an overvoltage protection circuit according to the invention.

FIG. 7 illustrates a communication line overvoltage protection circuit well adapted for minimizing capacitive loading of the line. This protection circuit includes a bridge constructed with four diodes with nodes 78 and 80 connected respectively to the tip conductor 12 and the ring conductor 14 of the communication line. Nodes 82 and 84 of the diode bridge are connected to respective resistors 64 and 66. The resistors 64 and 66 are coupled to a bias voltage source 48 for providing a bias voltage across a threshold device 86, such as a Zener diode. The Zener diode 86 can be selected to provide a reverse breakdown voltage suitable for the application involved. The bias voltage provides the same function as described above in connection with FIGS. 4 and 6. In addition, the diodes 52, 54, 56 and 58 can be either constructed or selected for low capacitance in the manner described above.

Figure 8:
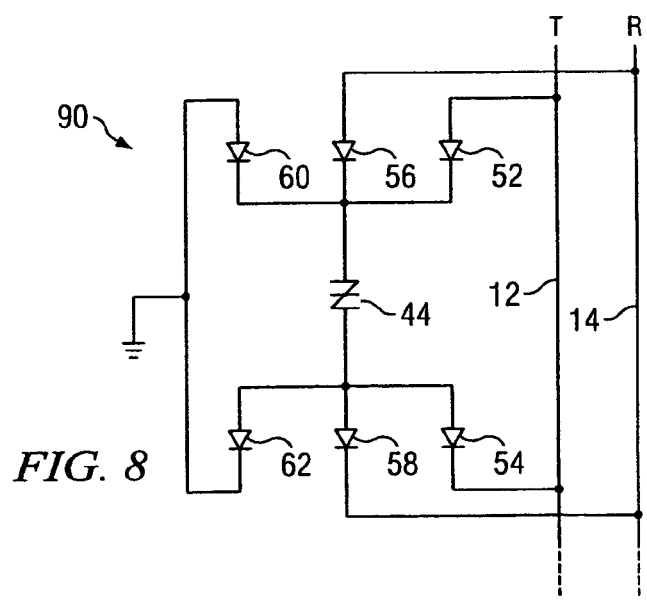
FIG. 8 illustrates a further embodiment of an overvoltage protection circuit according to the invention.

FIG. 8 illustrates another embodiment 90 of the invention which is similar to that shown in FIG. 6, but without the voltage bias or the isolation resistors. Again, this configuration provides a lower capacitance overvoltage protection circuit 90 than hereto afforded by carefully selecting the diodes for low capacitance in the manner described above.

From the foregoing, disclosed is an overvoltage protection circuit for biasing an overvoltage protection device into an area of operation where the device capacitance is lowered, as is the change in capacitance as a function frequency and voltage. By utilizing a biased overvoltage protection device, the communication line connected thereto can be optimized in terms of high speed data transmission and data rates. The overvoltage protection circuit does not require a grounded bias supply, and employs only a single unidirectional overvoltage protection device. A pair of isolation resistors isolate the bias voltage supply from the overvoltage protection device, as well as from the communication line.

The various embodiments have been described in connection with the use of a Sidactor overvoltage protection device for protecting a tip and ring type of communication line. These components are merely illustrative, as other overvoltage protection devices and lines can be employed with equal effectiveness. For example, the biased overvoltage protection circuit of the invention can utilize other two and three terminal thyristors, including SCR's, triacs, etc. Communication lines other than the tip and ring type can be used with the overvoltage protection circuit of the invention.

While the present invention has been described above in connection with various embodiments, it is to be understood that the disclosure has been made by way of example only, as many changes in detail and structure may be made to the invention without departing from the spirit and scope of the invention, as defined by the appended claims.

What is claimed is:

1. A low capacitance overvoltage protection circuit, comprising:
   an overvoltage protection device having at least two terminals, said overvoltage protection device responsive to an overvoltage for providing a low impedance path between said two terminals;
   said overvoltage protection device characterized by a rated surge current;
   a diode bridge having at least four nodes, and said diode bridge having a first diode connected between a first node and a third node, a second diode connected between the third node and a second node, a third diode connected between the second node and a fourth node, a fourth diode connected between the first node and the fourth, and said overvoltage protection device connected between said first and second nodes of said diode bridge;
   one or more of said diodes having a respective junction area capable of carrying the rated surge current of said overvoltage protection device and not substantially more, thereby minimizing a capacitance of said diode bridge; and
   said diode bridge does not include series bridge diodes to reduce capacitance, between at least one of the following four pairs of nodes;
      a) said first node and said third node,
      b) said third node and said second node,
      c) said second node and said fourth node
      d) said fourth node and said first node.

2. The overvoltage protection circuit of claim 1, wherein said overvoltage protection device comprises a four-layer semiconductor device with only two terminals.

3. The overvoltage protection circuit of claim 2, wherein said four-layer semiconductor device comprises a sidac.

4. The overvoltage protection circuit of claim 1, wherein said diode bridge comprises three diode pairs, a cathode and an anode of one diode pair being adapted for connection to a ground.

5. The overvoltage protection circuit of claim 1, wherein said overvoltage protection device operates in a unidirectional manner, and is connected in said bridge so that currents resulting from respective overvoltages of both positive and negative polarities pass between said first and second nodes in only one direction.

6. The overvoltage protection device of claim 1, wherein said diodes have junction areas rated for carrying no more than 150 percent of the rated surge current of said overvoltage protection device.

7. A method of constructing an overvoltage protection circuit, comprising the steps of:
   selecting an overvoltage protection device having a desired rated surge current and a desired breakover voltage;
   selecting diodes for a bridge so that at least some of the diodes of the bridge have a rated surge current not substantially higher than that of the overvoltage protection device; and
   placing the overvoltage protection device and the diodes into the bridge circuit to thereby provide a low capacitance overvoltage protection circuit, and arranging the bridge diodes and the overvoltage protection device so that currents resulting from overvoltages of both polarities pass through at least one bridge diode and said overvoltage protection device.

8. The method of claim 7, further including selecting the diode with a surge current rating not exceeding about 150 percent of the rated surge current of the overvoltage protection device.

9. The method of claim 7, further including constructing the diode with a small-area junction to reduce device capacitance, and forming said small area junction as a lightly doped junction to provide a high reverse breakdown voltage.

10. The method of claim 7, further including selecting the diode with a capacitance no larger than about 20 pf at zero volt bias.

11. The method of claim 7, further including selecting the overvoltage protection device and at least two diodes of said bridge to achieve an overall circuit capacitance no larger than about 20 pf at zero volt bias.

* * * * *